(Model.)
T. W. LAWSON.
MANIFOLD SALES BOOK.
No. 406,845.                    Patented July 9, 1889.
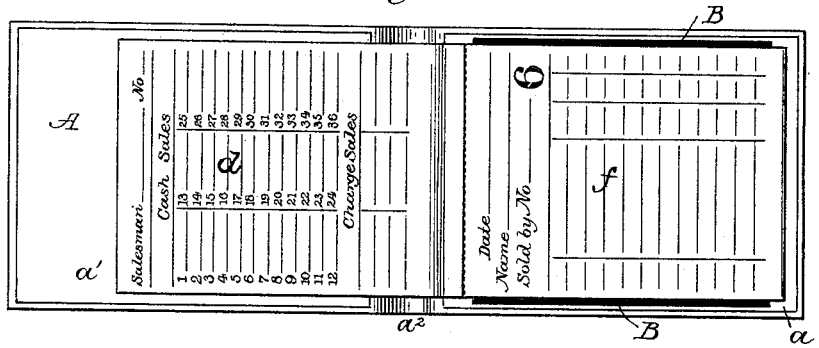
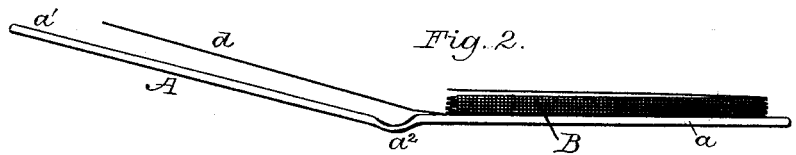
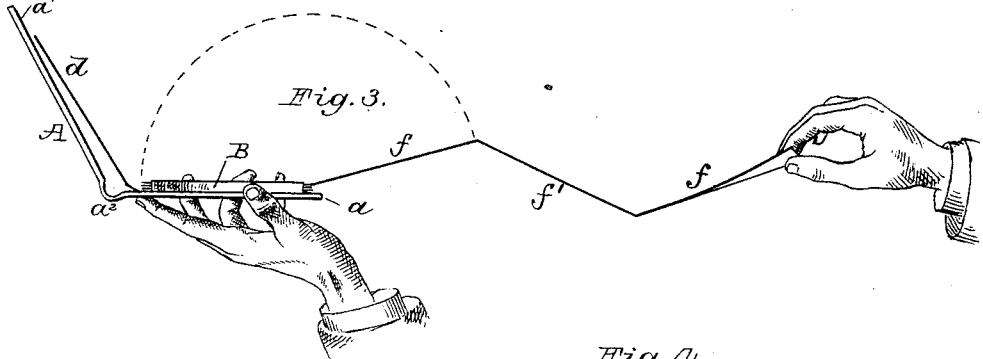
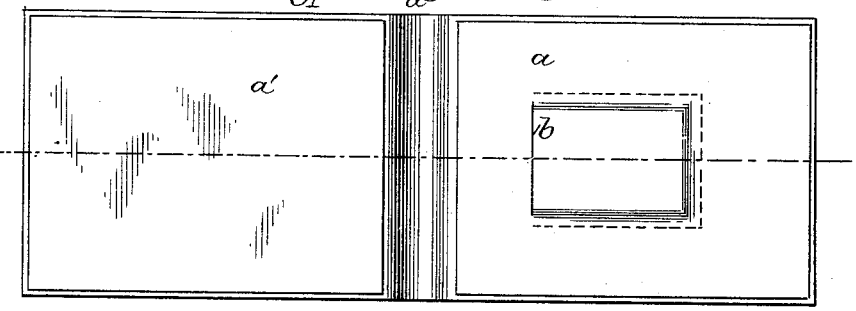
Attest:
Philip F. Larner
Lowell Bartle
Inventor:
Thomas W Lawson,
By Wm. C. Wood
Attorney.

(Model.)
T. W. LAWSON.
MANIFOLD SALES BOOK.
No. 406,845. Patented July 9, 1889.
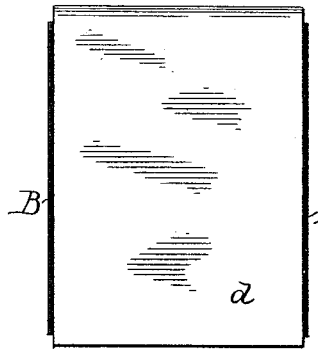
Fig. 6.
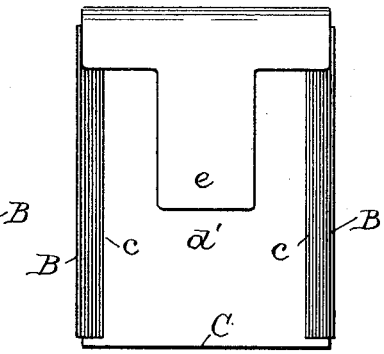
Fig. 7.
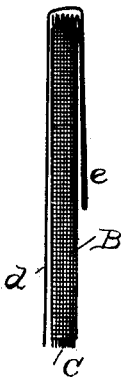
Fig. 8.
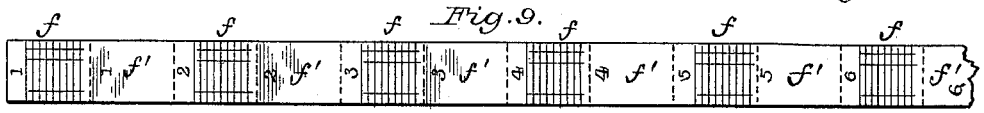
Fig. 9.
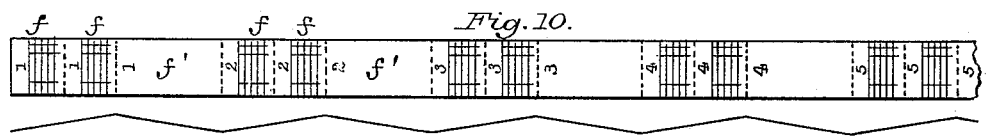
Fig. 10.
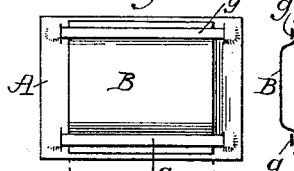
Fig. 11.
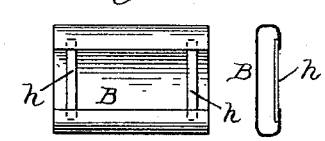
Fig. 12.
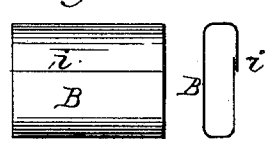
Fig. 13.
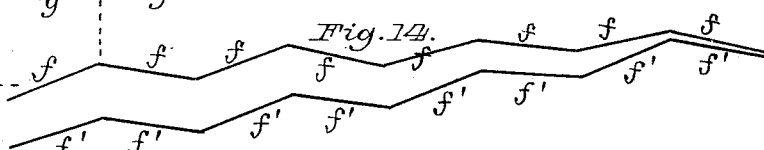
Fig. 14.
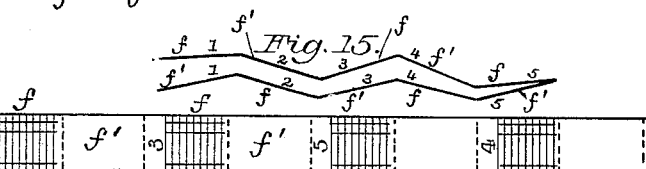
Fig. 15.
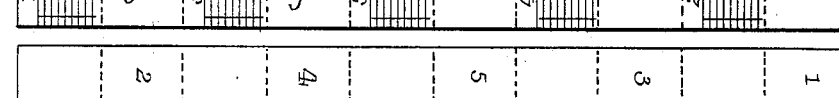
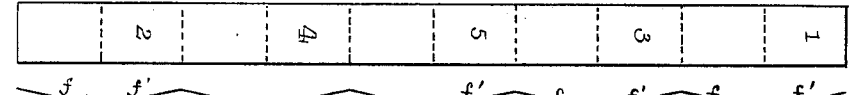
Attest:
Philip F. Larner
Nowell J. Bartle
Inventor:
Thomas W. Lawson,
By
Attorney.

UNITED STATES PATENT OFFICE.

THOMAS W. LAWSON, OF CAMBRIDGE, ASSIGNOR TO THE LAWSON MANUFACTURING COMPANY, OF BOSTON, MASSACHUSETTS.

MANIFOLD SALES-BOOK.

SPECIFICATION forming part of Letters Patent No. 406,845, dated July 9, 1889.

Application filed February 11, 1886. Serial No. 191,629. (Model.)

*To all whom it may concern:*

Be it known that I, THOMAS W. LAWSON, of Cambridge, in the county of Middlesex and State of Massachusetts, have invented certain new and useful Improvements in Manifold Sales-Books; and I do hereby declare that the following specification, taken in connection with the drawings furnished and forming a part thereof, is a clear, true, and complete description of the several features of my invention.

My said improvements relate to that class of sales-books which are used as safeguards against peculation, and embody sale-slips accompanied by and used with manifold or duplicating fabric and with slips for receiving a fac-simile copy of whatever inscription may be made by a salesman upon the sale-slips. It has long been customary to consecutively number these sale-slips and to bind them in regular book form with alternate slips, (for fac-simile copies,) which are also consecutively numbered to correspond with their respective sale-slips. In thus binding slips of this kind the occasional omission of slips from the series is liable to occur in any book, and this fact enables dishonest salesmen when called to account for missing slips not found either in their books or among their returns to allege without fear of positive contradiction that an error must have occurred either in the numbering or in the assembling and binding of the slips, or, in other words, that the particular sales-slip book involved was an imperfect one when received by the salesman from his employer or by the latter from the printer or stationer.

The main object of my present invention is to render it practically impossible for any such omissions or deficiencies to occur in a sales-slip book, and this can only be done by obviating the assembling and binding of separate slips, which are essentially involved in the use of all prior sale-slip books known to me. In accomplishing this end I have for the first time introduced the feature of actual continuity between the first and the last of a series of sales-slips in a pack or pile, which is to all intents and purposes in book form—that is to say, instead of having the pack, pile, or book of slips composed of separate pieces of paper and essentially united at one or more edges by means of paste, glue, stitching, or fasteners, or otherwise bound together in book or tablet form, I employ a continuous strip of paper, on which the slips are developed by suitable inscriptions, and I fold said slip in "zigzag" lines, each fold being between each two slips, or between each duplicate copy-slip and the preceding and succeeding sale-slip, so that the series of slips are integral, and hence no slip or slips can possibly be detached from the interior of the stack or book without ready detection, and also so that the numbering or lettering or other means relied upon for securing a visible sequential order can be applied without liability of error throughout the series. The zigzag fold in the series of integral slips enables said slips to be compactly piled in tablet form, or what may be termed "book form;" but their integral continuity need not be impaired by such of the well-known systems of binding as will not prevent the ready and consecutive withdrawal of the slips, commencing with the first of the series—as, for instance, thin paper might be pasted to one or two sides of the pile or stack of slips, if desired, without departure from my invention, although I do not deem such pasting at all necessary.

In their best form my sale-slips have integral intervening or alternate slips interfolded therewith for receiving duplicate copy; but two separate slips of paper of corresponding length may be employed without departure from certain portions of my invention, provided the sale-slips and copy-slips are interfolded so that each copy-slip will be beneath its appropriate sale-slip in regular sequential order. While thus obviating the cost of labor in binding, I also economize in stock, because the quantity of paper used by me in a stack or pile of zigzag folded sale-slips is limited to the actual surface area required for the slips, whereas heretofore each sale-slip and each copy-slip has been provided with a binding-stub. While the value of the stock thus practically wasted in the stubs of a single book would be small, it aggregates largely to the manufacturer and constitutes an important item in the cost of production.

The manner in which the duplicating or manifold fabric is applied to and used with my zigzag folded slips can be largely varied without departure from certain portions of my invention; but I have for the first time put said fabric into such a form that while serving its prime purpose as a duplicating medium for duplicating on a copy-slip memoranda entries made on a sale-slip, as heretofore, it also performs the important service of a pocket or binder for a stack or pile of slips, and this is of special value with the consecutive slips as folded by me. This result is accomplished by having a strip of said fabric, which is usually a carbon-cloth or carbon-paper of desirable tensile strength and proper width, confined or united at its ends to form a pocket or loop, which is open at least at one end and adapted to receive a pile or stack of slips endwise, so that said slips will be laterally inclosed and confined in place by said fabric, and also enable the outer portion of the fabric to be used for duplicating purposes. This pocket can be formed by securing the ends of the duplicating fabric to the under side of the last slip of a series of slips, or to a thin cover applied to said last slip, or to a rigid tablet, whether the latter be single or hinged, so as to constitute a tablet-case; or said pocket may be formed by directly uniting the two ends of the strip of fabric, and thus provide for rotating it on a stack of slips, and thereby presenting fresh surfaces for duty; or said fabric may have its ends coupled by elastic bands for enabling the pocket to progressively adapt itself to and to snugly embrace the stack of slips, notwithstanding the gradual diminution in the thickness of the stack incident to the sequential removal of the slips, all of which variations in the form of a binder will be fully illustrated and hereinafter described in detail.

It is to be understood that it is not new to have duplicating fabric so arranged that it may in use be made to present fresh surfaces for duty; but prior to my invention this has only been accomplished by means of a complex box or case, in which a pile of slips is placed and mechanically confined, and an endless band of duplicating fabric is mounted on rollers in said box or case, so as to locate one portion of the fabric over a portion of the top of the pile of slips, the latter being forced toward the fabric by means of a back plate, between which and several rigid cross-bars on the front of the box said pile is clamped and confined. I not only wholly obviate the necessity for such a box or case, but I provide for presenting fresh surfaces of the duplicating fabric by making the latter perform the novel duty of a movable binder, by which the stack of slips is maintained in a suitably compact form.

Whether my sale-slips are to be used with or without a rigid tablet or a hinged tablet-case it is desirable that each series be accompanied by the usual sales "record-sheet," and therefore I apply a front cover by pasting the same to one end of the last slip of a series; or I combine said cover with a manila or other suitable back and suitably attach the latter to the last slip of a series, so that said cover may be utilized as a record-sheet, the latter being printed on the inner surface of the front cover. For mounting such a stack of slips on a rigid tablet or in a tablet-case said tablets are provided, as heretofore, with a suitable mortise or slit, and the said back is properly stiffened and formed into a tongue or flap, which will enter said mortise or slit endwise like a tenon, and thereby properly secure the stack of slips to the tablet.

To more particularly describe my invention, I will refer to the accompanying drawings, in which—

Figures 1 and 2 illustrate, respectively, in top and edge views a hinged tablet-case, a series of sale-slips and copy-slips, and the duplicating fabric, the whole being arranged and combined together in a desirable form, the tablet-case being open in both forms as when ready for use. Fig. 3 illustrates the same as when a complete sale-slip and its copy-slip is distended for detachment. Figs. 4 and 5, in interior plan and longitudinal central section, illustrate the opened tablet-case. Figs. 6, 7, and 8, in top, bottom, and edge views, illustrate a complete stack of slips having a pocket or binder of duplicating fabric, a sales record-sheet, and a back provided with a flap or tongue. Fig. 9, in top and edge views, represents an unfolded or distended series of my sale-slips and copy-slips in a preferred form. Fig. 10, in top and edge views, illustrates an unfolded series of double sale-slips and their copy-slips. Fig. 11 illustrates in two views a tablet provided with an adjustable pocket or binder of duplicating fabric for the reception of sale-slips. Fig. 12 in two views illustrates a detached binder or pocket of duplicating fabric provided with elastic bands by which the pocket or binder is made adjustable. Fig. 13 in two views illustrates a binder or pocket of duplicating fabric adapted to present fresh surfaces for duty when it incloses a stack or pile of slips. Fig. 14 illustrates a series of consecutive sale-slips and a series of consecutive copy-slips, both adapted to be folded zigzag and to be used with relation to each other and with duplicating fabric. Fig. 15 illustrates in several views a strip of integral sale and copy slips, which is first folded upon itself at its middle and is then folded zigzag.

The drawings, Figs. 1 to 9, inclusive, illustrate the main features of my invention as embodied in a complete stack of slips mounted in a hinged tablet-case, although certain other constructions of the pocket or binder composed of duplicating or manifold fabric are illustrated in certain of the other figures; but either of these pockets or binders can be readily employed in lieu of that shown in Fig. 1.

Referring now to Figs. 1 to 5, inclusive, it is to be understood that the tablet-case A is composed of a rigid or stiff back $a$ and a front $a'$, hinged at $a^2$, in the usual manner, by suitable flexible material. The case on the inner face of its back $a$ has a mortise $b$, as heretofore employed, for receiving an ordinary bound tablet provided with a tongue or flap at its back. This mortise can be cheaply provided by means of a laterally-slitted piece of paper pasted or glued to the tablet above the slit, and also at all other points except below the slit, as indicated in dotted lines in Fig. 4, thus providing the mortise, which is parallel with the back, as clearly indicated in Fig. 5. This mortise serves in part as a ready means for attaching a stack or pile of sale and copy slips, as will be hereinafter more fully described.

In Figs. 1 to 3, inclusive, B denotes the novel pocket or binder, in part essentially composed of duplicating or manifold fabric, which may be either cloth or suitable paper, treated by any of the well-known methods usually employed for rendering it suitable for duplicating service. Broadly considered as a part of my invention, it is immaterial how this pocket or binder may be constructed, provided one or more sides thereof serve as the duplicating medium, and also provided it is open at least at one end to receive a stack or pile of interfolded slips. In its simplest form said pocket or binder is illustrated in Figs. 6, 7, and 8, wherein C denotes the pile or stack of sales and copy slips, and the pocket B is formed of a strip of duplicating fabric of proper width, pasted or otherwise secured at its ends $c$ to the under side of the pile. As shown in these figures, there is also attached to said stack or pile of slips a front cover, the inner face of which serves as a sales record-sheet $d$, printed in suitable form, and a backing $d'$, which may or may not be integral with said cover. This cover is secured to the bottom of the stack, and extends loosely over the top or end thereof without obstructing the folded ends of the slips, and the ends $c$ of the duplicating fabric of which the pocket or binder is composed are folded over this backing and pasted or glued thereto. Should such a backing not be used, the ends $c$ could be attached directly to the under side of the bottom slip of a stack. Now, for conveniently mounting the stack of slips on a tablet or in a tablet-case, the stack at its back is provided with a flap or tongue $e$, usually composed of paper doubled and stiffened by glue or paste, and this tongue serves as a tenon which can be slipped into the mortise or recess $b$. This flap or tongue $e$ can, if desired, be made as wide as the stack or pile of slips, the slit of the mortise being then of corresponding length, thus obviating the labor of cutting at each side which is involved in developing the particular tongue-tenon shown.

Now, referring to Fig. 9, it is to be understood that the series of sales-slips $f$ and copy-slips $f'$ are integrally connected from end to end, and that fifty of each of said slips, or one hundred in all, usually constitute a stack, pile, or book C, and that said slips are folded zigzag or in and out upon themselves, with a fold at every junction of a sale-slip with a copy-slip, as clearly indicated by dotted lines. For facilitating the separation of the slips from each other, perforations or equivalent heavy crease-lines are employed. In this particular form I employ sale-slips $f$, which alternate with copy-slips $f'$, so that when folded zigzag every copy-slip underlies its appropriate sale-slip, and it will be seen that the slips of each pair bear the same number—that is to say, the first sale-slip is numbered "1," and so, also, is its copy-slip. The next pair are numbered "2," and so on throughout the series.

It will be seen when the complete book or stack of interfolded slips, &c., (shown in Figs. 6, 7, and 8,) is held face up in the left hand, or is held by the same hand after said stack has been placed on a stiff tablet, as in Fig. 3, that the first sale-slip can be readily placed over the duplicating fabric, thus interposing the latter between said sale-slip and its underlying copy-slip, which is to receive the duplicate copy of any entry which may be made on the sale-slip. After thus completing the entry, the end of the sale-slip $f$ is seized by the right hand and drawn backward, thus not only releasing the inscribed copy-slip $f'$ from the binder or pocket, but also drawing out the next sale-slip $f$, and after tearing off the two already used slips the exposed sale-slip will be turned back, as indicated in dotted lines in Fig. 3, until it lies upon the duplicating fabric ready for use, like the first, and so on throughout the series.

It must not be understood that the valuable results incident to the use of the zigzag folded series of integral or continuous slips are dependent upon the use therewith of duplicating fabric as a separate element—as, for instance, in one form of my sales-book the back of each sales-slip is lightly smeared or coated with coloring-matter, which is readily transferable in lines to a copy-slip when subjected to the pressure and stroke of a pencil applied to a sale-slip; and with such a sales-book a thick stiff sheet of paper or its equivalent is inserted beneath the copy-slip for preventing the manifold copy from extending beyond or below the particular copy-slip on which a duplicate memorandum is desired.

As thus far described, it will be seen that no "book-binding" operations are involved in the forming of the stacks or piles of slips, and that the waste of stock heretofore incident to stubs necessary for binding is wholly obviated. It will also be seen that the duplicating fabric is so far confined in place as to involve no need of handling it, as is necessary with the hinged sheets of such fabric heretofore used, and that the portion of said fabric which is used for duplicating is always maintained in proper position and in favorable condition for immediate service. For meeting the varied notions of salesmen in the matter of convenience, I have devised a variety of these pockets or binders, some of which I will now describe.

In Fig. 11 the tablet A may be of the hinged variety already described; but as here shown it has no hinged portion. This tablet is provided with the mortise *b*, before described, and with the binder or pocket B; but in this instance the duplicating fabric is secured at its sides to the top face of the tablet by means of two flat springs or clamping-pieces *g*, which are confined at their ends within suitable slits or mortises in the tablet, and the duplicating fabric is slipped between said springs and the coincident surface of the tablet. This construction enables the duplicating fabric to be drawn out at its ends as the thickness of the stack of slips decreases, and thereby keeping the binder in close relation with the remaining portion of the stack down to the last of the series of slips.

In Fig. 12 the pocket or binder B of duplicating fabric is composed of a strip of fabric of proper width, and its ends are connected by means of elastic bands *h*, stitched or otherwise united thereto, as clearly shown, so that when the pocket is placed over a full stack of slips said bands will be slightly distended or sufficiently so to properly tighten the portion of the fabric which is to do duty for duplicating and to take up or compensate for the gradual decrease in the thickness of the stack or pile of slips.

In Fig. 13 the pocket or binder B of duplicating fabric is composed of a band of the fabric of proper width and of such length as will snugly inclose a full stack of slips, and enough longer to enable its two ends to be properly joined, as at *i*. This form of pocket or binder enables it to be rotated on a stack for presenting fresh portions thereof for duty.

The feature of constructing the binder wholly or in part of duplicating fabric is, I believe, broadly new, whether it be non-adjustable or made adjustable for presenting fresh surfaces for duty, and it should be observed that the last-named function is not wholly dependent upon the particular form illustrated in Fig. 13, it being obvious that the form illustrated in Fig. 12 admits of the shifting of the fabric from side to side in either direction, although not so completely as with the form shown in Fig. 13. It will also be obvious that the same function is present in the form shown in Fig. 11, because the duplicating fabric being in a strip of proper length it can readily be shifted in position to and fro. It will be seen that either of these forms of duplicating binder devised by me may be used with substantially equal facility with my novel interfolded slips, and also that their utility is not dependent upon the use therewith of any particular variety of slip.

Now, referring back to Fig. 9, it is to be understood that I therein show a form of my novel sale-slips which is best adapted for general service, in that each sale-slip is followed sequentially by its appropriate copy-slip; but it is sometimes desirable that the sale-slips should be duplicated, as shown in Fig. 10, wherein I show two sale-slips *f* for each copy-slip *f'*, the same number being applied to each pair of said duplicate sale-slips and to the copy-slip which is common to both.

To illustrate the variations of arrangement which can be made in these slips, while preserving the advantages incident to their integral continuity throughout the series and to the interfolding feature, I will refer to Fig. 14, wherein the sale-slips *f* are in one continuous strip and the copy-slips *f'* are in another, each series being consecutively numbered, and the two strips being first connected at their terminals and then interfolded in zigzag lines, as clearly indicated.

In Fig. 15 I illustrate still another arrangement of the sales and copy slips, in which a long strip of paper is first appropriately printed and numbered and then folded from its center upon itself, and then, after being thus folded, the two ends are together folded zigzag, as before described. In this form the numbering is alternate, 1, 3, 5, &c., from the initial end of the slip to the middle, and from that point to the terminal slip of the series the numbering is also alternate, but backward or reversed—as, for instance, 4, 2. The sale-slips *f* alternate as before with the copy-slips *f'*, so that when folded, as indicated, each copy-slip *f* will underlie its appropriate sale-slip; but, considering each half of the folded strip as a separate strip, the sale-slips are alternated consecutively, first on one strip and then on the other, and the same is true of the copy-slips. The numbering of the copy-slips *f'* may be either on the back of the strip or on the front side, on which the sale-slip numbers appear.

Each of these forms of piles or stacks involves a series of sale-slips and a series of copy-slips, which are interfolded so that each copy-slip is beneath its appropriate sale-slip, and each affords the integral continuity throughout a series, by which it is rendered impossible for any but the top slips of a stack to be removed without prompt detection, and in all of them wasteful stubs are obviated, and each of them can be conveniently used with duplicating fabric, although the forms shown in Figs. 9 and 10 are best suited for use with the duplicating binder or pocket—as, for instance, with the sale and copy slips arranged as shown in Figs. 14 and 15, a flap or hinged sheet of duplicating fabric should be applied at one side of a stack at its bottom, or to one side of a tablet, as indicated in dotted lines in Fig. 11, it being understood that certain portions of my invention are not dependent upon having the duplicating fabric serve as a binder, it being obvious that even with the forms shown in Figs. 1 and 2 the duplicating fabric may be inserted in the form of a sheet, as indicated in dotted lines in Fig. 2, and secured at the hinged portion of the tablet-case or to the under side of the pile at its end, and be as readily used with each sale-slip as with the ordinary forms of bound slips now in general use. It will also be seen that either of the forms of stacks or piles can be used without a tablet, and that each form may be provided with a tongue or flap for use with a tablet, and with or without a record sales-sheet, and also with or without a special backing or cover. In all of these forms the sequential order, whether it be continuous or alternate, throughout an integral series of slips is absolutely reliable, it being only necessary that reliable numbering mechanism be employed, it being obvious that the matter of variation in numbering which is involved in some of the forms described depends merely upon an appropriate organization of and mode of operating the numbering mechanism.

In referring to the integral character of the series of sale-slips and copy-slips, it is to be understood that I do not mean to exclude the joining of the ends of long strips of paper prior to printing and numbering, which is sometimes desirable for securing the uninterrupted operation of the machines employed for printing, numbering, and perforating.

Many other variations and modifications of various portions of my sales-book have been devised by me; but those illustrated and described are believed to be ample for the purposes of this specification. It is also believed that persons skilled in such matters will readily perceive the value of my improvements, and from my disclosures be readily enabled to make such variations in form and arrangement as may be deemed by them best suited for use in connection with any particular lines of trade.

Having thus described my invention, I claim as new and desire to secure by Letters Patent—

1. A pocket or binder for use in connection with slips for sales-memoranda and for duplicate copies thereof, composed, at least in part, of duplicating fabric which is relied upon for confining said slips in position convenient for service, and which also serves as a duplicating medium, substantially as described.

2. In a manifold sales-book, the combination, substantially as hereinbefore described, of a stack or pile of zigzag-folded slips for sales-memoranda and for duplicate copies thereof, and a fabric which constitutes the front of a pocket or binder for said pile or stack, and also serves as the duplicating medium, whereby said folded slips are maintained in compact form and the duplicating fabric maintained in position for convenient use in making duplicate copies.

3. In a manifold sales-book, the combination, substantially as hereinbefore described, of a stack or pile of integrally-connected sales-slips and their appropriate copy-slips and duplicating fabric, which is adjustably arranged with relation to said stack to operate as a binding medium and enable fresh surfaces of said fabric to be presented for duty between any pair of said slips.

4. The combination, substantially as hereinbefore described, of a series of zigzag-folded sales-slips and a series of slips for fac-simile copies, interfolded, and each copy-slip arranged with relation to its proper sale-slip for receiving a duplicate of any memoranda made upon said sale-slip.

5. In a manifold sales-book, a series of zigzag-folded sale-slips consecutively and integrally connected with a series of alternating slips for receiving fac-simile copies of entries made upon said sale-slips, substantially as described.

THOMAS W. LAWSON.

Witnesses:
A. H. FELLY,
J. J. LYONS.